(12) United States Patent
Zimmermann

(10) Patent No.: US 7,712,448 B2
(45) Date of Patent: May 11, 2010

(54) INTERNAL COMBUSTION ENGINE WITH STARTER DEVICE

(75) Inventor: Helmut Zimmermann, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 12/111,211

(22) Filed: Apr. 29, 2008

(65) Prior Publication Data

US 2008/0271698 A1    Nov. 6, 2008

(30) Foreign Application Priority Data

May 3, 2007    (DE) .................... 10 2007 020 680

(51) Int. Cl.
*F02N 1/00* (2006.01)
(52) U.S. Cl. ............... 123/185.3; 123/179.1; 123/185.1
(58) Field of Classification Search ............ 123/185.2, 123/185.3, 179.1, 185.1
See application file for complete search history.

(56) References Cited

U.S. PATENT DOCUMENTS

| | | | | |
|---|---|---|---|---|
| 3,763,842 A | * | 10/1973 | Dooley et al. | 123/185.14 |
| 4,159,510 A | * | 6/1979 | Kovach et al. | 362/265 |
| 4,848,288 A | * | 7/1989 | Murase et al. | 123/179.24 |
| 5,063,812 A | * | 11/1991 | Mercier | 74/575 |
| 6,363,901 B1 | * | 4/2002 | Watanabe et al. | 123/185.3 |
| 2005/0051124 A1 | * | 3/2005 | Adam et al. | 123/179.1 |

* cited by examiner

*Primary Examiner*—Stephen K Cronin
*Assistant Examiner*—David Hamaoui
(74) *Attorney, Agent, or Firm*—Gudrun E. Huckett

(57) ABSTRACT

An internal combustion engine has a starter device, wherein the starter device has a drive member and a driven member and a locking mechanism for coupling the drive member and the driven member to one another for starting the internal combustion engine. The locking mechanism has at least one pawl that is pivotably supported on the driven member. For decoupling the drive member and the driven member, the at least one pawl is pivoted outwardly relative to an axis of rotation of the starter device. The at least one pawl has at least one pivot position in which the at least one pawl contacts at least one contact area of the driven member. The at least one pawl has at least one cover covering the at least one contact area.

19 Claims, 3 Drawing Sheets

INTERNAL COMBUSTION ENGINE WITH STARTER DEVICE

BACKGROUND OF THE INVENTION

The invention relates to an internal combustion engine comprising a starter device, wherein the starter device comprises a drive member and a driven member that can be coupled to one another by a locking mechanism. The locking mechanism has at least one pawl that is pivotably supported on the driven member which pawl for decoupling the drive member and the driven member, is pivoted outwardly and in at least one pivot position contacts at least one contact area of the driven member.

U.S. 2005/0051124 A1 discloses a starter device for an internal combustion engine that comprises a locking mechanism for connecting the drive member and the driven member. The pawls of the locking mechanism are arranged in a receiving space on the flywheel which space is surrounded by a peripheral wall.

In operation, the flywheel conveys a stream of air. The stream of air can contain dirt particles. Since the receiving space of the locking mechanism is not completely sealed relative to the ambient, dirt particles can also reach the receiving space. As a result of centrifugal forces the dirt particles are thrown outwardly against the peripheral wall. The dirt particles will deposit on this wall and can thus cause the pawls to no longer be able to completely pivot outwardly or to become stuck in the outwardly pivoted position. This impairs the function of the locking mechanism. Therefore, it may be necessary to clean the starter device before starting the internal combustion engine.

SUMMARY OF THE INVENTION

It is an object of the present invention to provide an internal combustion engine with a starter device of the aforementioned kind that does not become soiled easily.

In accordance with the present invention, this is achieved in that the pawl has at least one cover covering at least one contact area.

The pawl is pivotably supported on the driven member. The pivot movement of the pawl causes a relative movement in the area of contact locations where the pawl and the driven member contact one another. The driven member is in this case the driven member of the starter device and, for example, is comprised of the flywheel and elements such as bearing bolts and the like of the pawl that are fixedly connected to the flywheel. Contact areas are the area where the pawl rests against the driven member, for example, the flywheel; the area where the pawl contacts the bearing bolt of the driven member on which bearing bolt the pawl is supported; as well as the area where the pawl contacts a spring. By means of the cover provided on the pawl the contact area is protected from becoming soiled. In operation, the dirt particles move radially outwardly relative to the axis of rotation of the starter device as a result of centrifugal forces. The cover that covers the contact area in particular radially inwardly prevents that dirt particles can reach the contact area and can soil and clog the contact area. This measure extends significantly the servicing interval of the internal combustion engine i.e., the time between two sequential cleaning processes on the starter device.

Advantageously, at least one stop is arranged relative to the axis of rotation of the starter device radially outwardly relative the pawl so as to determine a pivot position of the pawl. Advantageously, the pawl has a cover that covers the stop. Advantageously, a first stop for determining the completely outwardly pivoted position (first terminal pivot position) of the pawl is provided. The pawl is resting against this stop in operation of the internal combustion engine, i.e., after starting the engine. The pawl in this position provides no connection to the drive member of the starter device. It is provided that a first cover of the pawl covers the first stop on a side facing the drive member. Advantageously, a second cover of the pawl is provided that covers the first stop in the circumferential direction relative to the axis of rotation of the starter device. The first stop is thus covered in operation on the side that is facing the drive member as well as in the circumferential direction by the pawl and is thus protected from dirt particles so that no dirt particles will collect on the first stop in operation.

Advantageously, a second stop for determining the completely inwardly pivoted position (second terminal pivot position) of the pawl is provided. Expediently, a third cover of the pawl covers the second stop on a side facing the drive member. A fourth cover of the pawl covers the second stop in the circumferential direction relative to the axis of rotation of the starter device. The third and fourth covers protect the second stop on the side facing the drive member as well as in the circumferential direction relative to the axis of rotation of the starter device. In this way, the second stop against which the pawl rests in the completely inwardly pivoted position, i.e., when coupled to the drive member, is protected from becoming soiled. The covers must not be directly arranged on the stops but must only be positioned in the radial direction between the axis of rotation of the starter device and the correlated stop. The covers are positioned thus in the direction of action of the centrifugal forces before and/or adjacent to the stop. The covers act like a spoiler so that the stop located at the respective cover is leeward relative to the stream of air generated in operation.

Advantageously, at least one cover is configured as a flow guiding or deflecting element that deflects in operation the stream of air away from the stop. By configuring the cover as a flow guiding element, the correlated stop can be protected well from becoming soiled.

It is provided that the pawl is arranged in a receiving space that is delimited by a peripheral wall wherein the peripheral wall has at least one penetration or passage. The peripheral wall protects the receiving space from becoming soiled. Because of the relative movement of the drive member and the driven member a complete sealing action of the receiving space is not provided so that dirt particles can enter the receiving space. The penetrations or passages ensure that the dirt particles that have entered the receiving space can also exit from the space so that they will not collect in the receiving space.

Advantageously, at least one penetration is arranged adjacent to the pawl. In particular, in the circumferential direction relative to the axis of rotation of the starter device, a penetration is provided on opposite sides of the pawl respectively. The penetration is advantageously designed such that the receiving space is protected by the peripheral wall sufficiently from dirt particles. At the same time, the penetration is so designed that dirt particles cannot become trapped in the penetration and cannot clog it. The penetration is advantageously not configured as a narrow gap. Advantageously, measured in the circumferential direction relative to the axis of rotation of the starter device, the width of the penetration is approximately 2 mm to approximately 15 mm. In particular, the width of the penetration, measured in the circumferential direction relative to the axis of rotation of the starter device, is approximately 5 mm to approximately 10 mm.

In order to ensure that the locking mechanism couples the drive member and driven member when the internal combustion engine is shut off and during the starting operation, a spring is provided that loads the pawl in the direction of its completely inwardly pivoted position. Advantageously, the spring is supported on a pin of the pawl and is supported with a first leg on the pawl and with a second leg on the driven member. The spring is advantageously a torsion spring. A relative movement results in operation between the spring and the pawl because a leg of the spring is arranged fixedly on the driven member and the other leg of the spring moves with the pawl. In order to prevent soiling in the area of the spring, it is provided that the pawl has a fifth cover that covers the pin radially inwardly relative to the axis of rotation of the starter device.

It is provided that the pawl is pivotably supported on a bearing bolt. The bearing bolt is fixedly connected to the driven member so that between the pawl and the bearing bolt a contact area is formed where the pawl moves relative to the bearing bolt. Advantageously, a securing ring for securing the pawl on the bearing bolt is provided. Expediently, the pawl has a sixth cover that covers the securing ring radially inwardly relative to the axis of rotation of the starter device. The sixth cover ensures that also in the area of the securing ring and between the bearing bolt and the pawl no dirt particles will collect that could cause blockage of the pawl.

DESCRIPTION OF PREFERRED EMBODIMENTS

Figure 1:
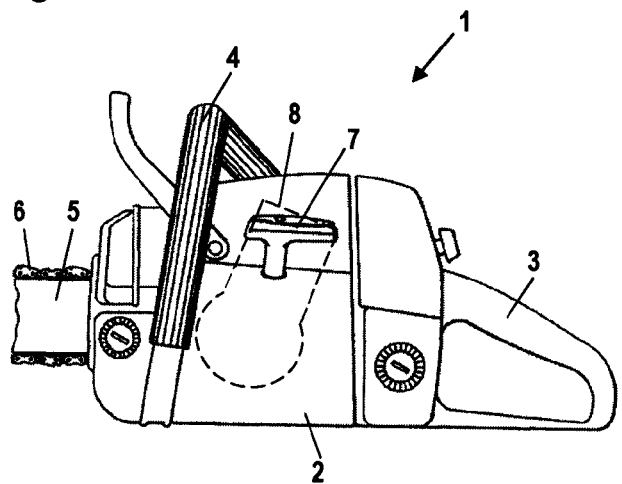
FIG. 1 is a schematic side view of a motor chainsaw.

FIG. 1 shows schematically a motor chainsaw 1 as an embodiment of a hand-held portable power tool. An internal combustion engine with a starter device according to the invention can however be used also in connection with other hand-held power tools, for example, cut-off machines, trimmers or the like. The motor chainsaw 1 has a housing 2 on which a rear handle 3 as well as a grip pipe 4 are secured. On the side of the housing 2 facing away from the rear handle 3 a guide bar 5 is secured on the housing 2 on which guide bar a saw chain 6 is arranged so as to circulate about it. The saw chain 6 is driven in circulation by an internal combustion engine 8 that is arranged in the housing 2. The internal combustion engine 8 is advantageously embodied as a single cylinder engine. The internal combustion engine 8 is in particular a two-stroke motor or a mixture-lubricated four-stroke motor. For starting the internal combustion engine 8 a starter grip 7 of a starter device is projecting from the housing 2.

Figure 2:
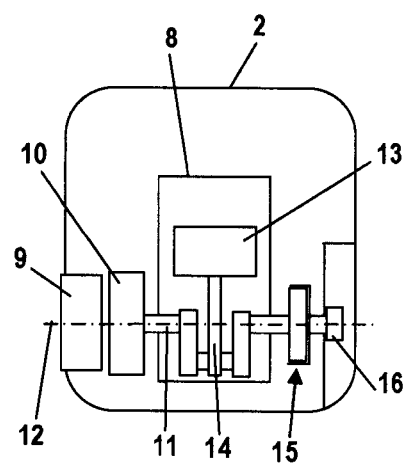
FIG. 2 shows a schematic cross-section of the housing of the motor chainsaw of FIG. 1.

As shown in the schematic illustration of FIG. 2, the internal combustion engine 8 has a piston 13 that drives in rotation by means of connecting rod 14 a crankshaft 11 about crankshaft axis 12. At one end of the crankshaft 11 a centrifugal clutch 15 is provided that, when a predetermined engine speed of the internal combustion engine 8 is surpassed, will connect the crankshaft 11 for common rotation to the drive pinion 16 driving the saw chain 6. On the opposite end of the internal combustion engine 8 a flywheel 10 is fixedly secured on the crankshaft 11. For starting the internal combustion engine 8, a starter device 9 is provided that is arranged adjacent to the flywheel 10 on the side of the flywheel 10 facing away from the internal combustion engine 10.

Figure 3:
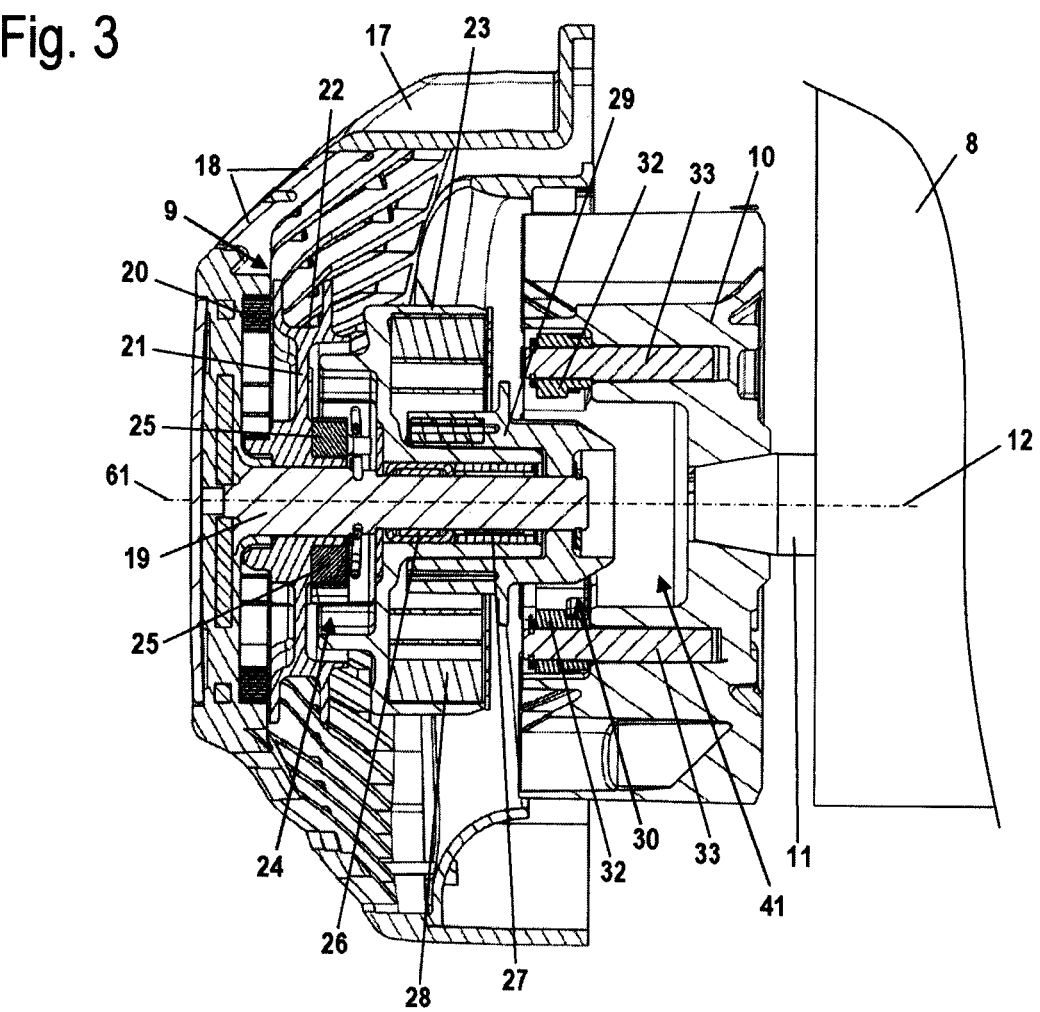
FIG. 3 is a section illustration of the starter device of the motor chainsaw.

FIG. 3 shows the starter device 9 in detail. The starter device 9 is arranged in a starter housing 17 that is part of the housing 2 of the motor chainsaw 1. The starter housing 17 has a plurality of cooling air openings 18 through which the flywheel 10 conveys cooling air for the internal combustion engine 8. The starter device 9 has a bearing shaft 19 that is secured in the starter housing 17. The bearing shaft 19 is arranged coaxially to the crankshaft 11. On the bearing shaft 19 a cable drum 21 is supported that is rotatable about axis of rotation 61 and that constitutes the drive member of the starter device. The axis of rotation 61 coincides with the crankshaft axis 12 of the crankshaft 11.

Between the cable drum 21 and the starter housing 17 a restoring spring 20 is arranged that is embodied as a spiral spring whose outer end is secured in the starter housing 17 and whose inner end is secured on the cable drum 21. The cable drum 21 has on its circumference a groove 22 for the starter cable (not illustrated). The starter cable is connected to the starter grip 7 illustrated in FIG. 1. By means of the grip 7 and the starter cable, the cable drum 21 is caused to rotate when actuated by the operator. It can also be provided that the starter device 9 is actuated electrically, for example, by an electric motor.

Adjacent to the cable drum 21 a spring housing 23 is supported on the bearing shaft 19 in which housing a starter spring 28 is arranged. Between the cable drum 21 and the spring housing 23 a first locking mechanism 24 is provided that has two pawls 25. The pawls 25 couple the cable drum 21 to the spring housing 23 when the starter cable is pulled.

The spring housing 23 is rotatably supported on the bearing shaft 19 by means of a bearing 26, for example, a needle bearing. The spring housing 23 is supported by means of a freewheel 27 arranged adjacent to the bearing 26 on the bearing shaft 19 so that it is ensured that the spring housing 23 can rotate in only one direction.

Figure 8:
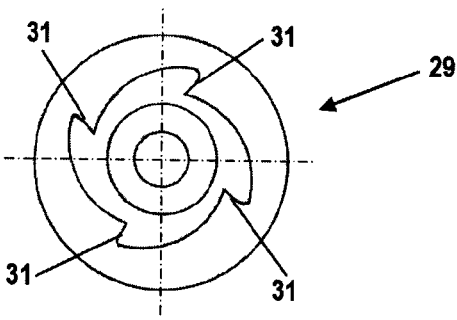
FIG. 8 is a side view of a follower of the start device.

The starter spring 28 is a spiral spring and is secured with its outer end on the spring housing 23 and its inner end on the follower 29 that is rotatably supported on the bearing shaft 19. The follower 29 has locking elements 31 as shown in FIG. 8 which locking elements 31 interact during the starting operation with the pawls 32 and form with them a second locking mechanism 30. The pawls 32 are supported pivotably on the flywheel 10. For this purpose, bearing bolts 33 are provided. The flywheel 10 forms the driven member of the starter device 1.

In operation, the operator actuates the starter grip 7 and thus causes the cable drum 21 to rotate. The first locking mechanism 24 couples the cable drum 21 and the spring housing 23 so that the cable drum 21 rotates also about the axis of rotation 61 of the starter device 9. In this way, the starter spring 28 is tensioned. Since the crankshaft 11 is standing still during the starting process, the pawls 32 are inwardly pivoted so that the second locking mechanism 30 provides a connection between the follower 29 and the flywheel 10. The starter spring 28 can thus rotate the crankshaft 11 as soon as the energy stored in the starter spring 28 is sufficient for moving the piston 13 of the internal combustion engine 8. The operator can wind the starter spring 28 by performing several pulling actions. During winding of the starter cable the cable drum 21 is decoupled from the spring housing 23. As a result of the freewheel 27 the spring housing 23 is maintained in its position. The starter spring 28 remains tensioned. Upon pulling again on the starter cable, the first locking mechanism 24 couples the cable drum 21 and the spring housing 23 so that the starter spring 28 is wound further. The second locking mechanism 30 connects the follower 29 and the flywheel 10 until the internal combustion engine 8 begins to run and the pawls 32, as a result of centrifugal force, will pivot outwardly and therefore decouple the follower 29 from the flywheel 10.

Figure 4:
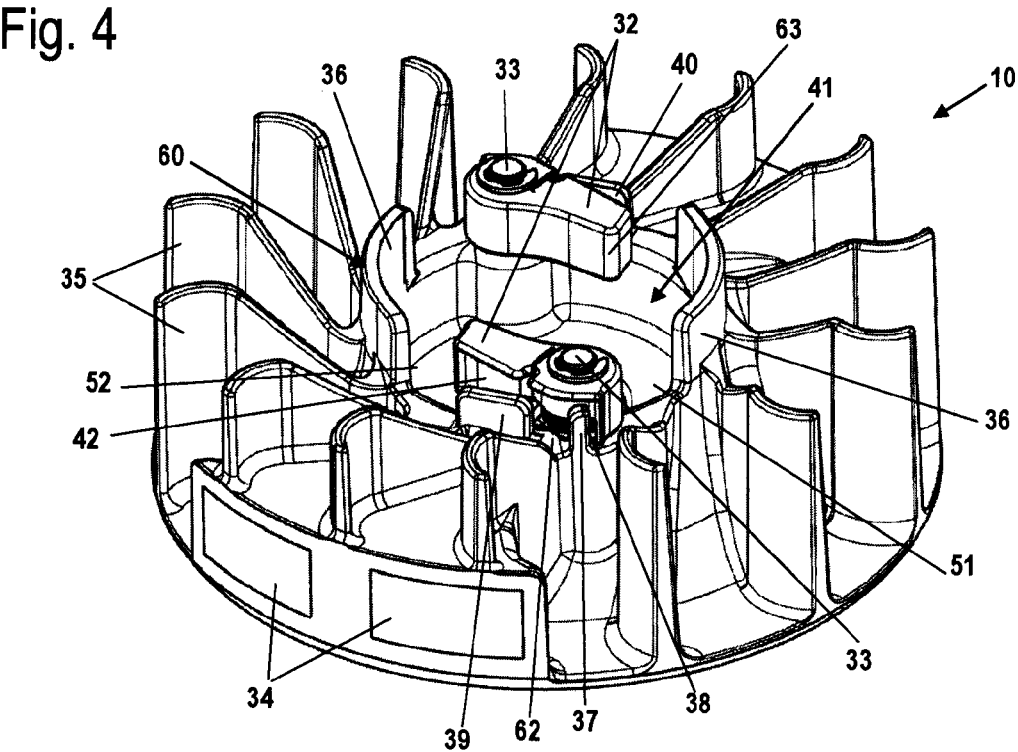
FIG. 4 is a perspective illustration of the fan wheel of the starter device.
Figure 5:
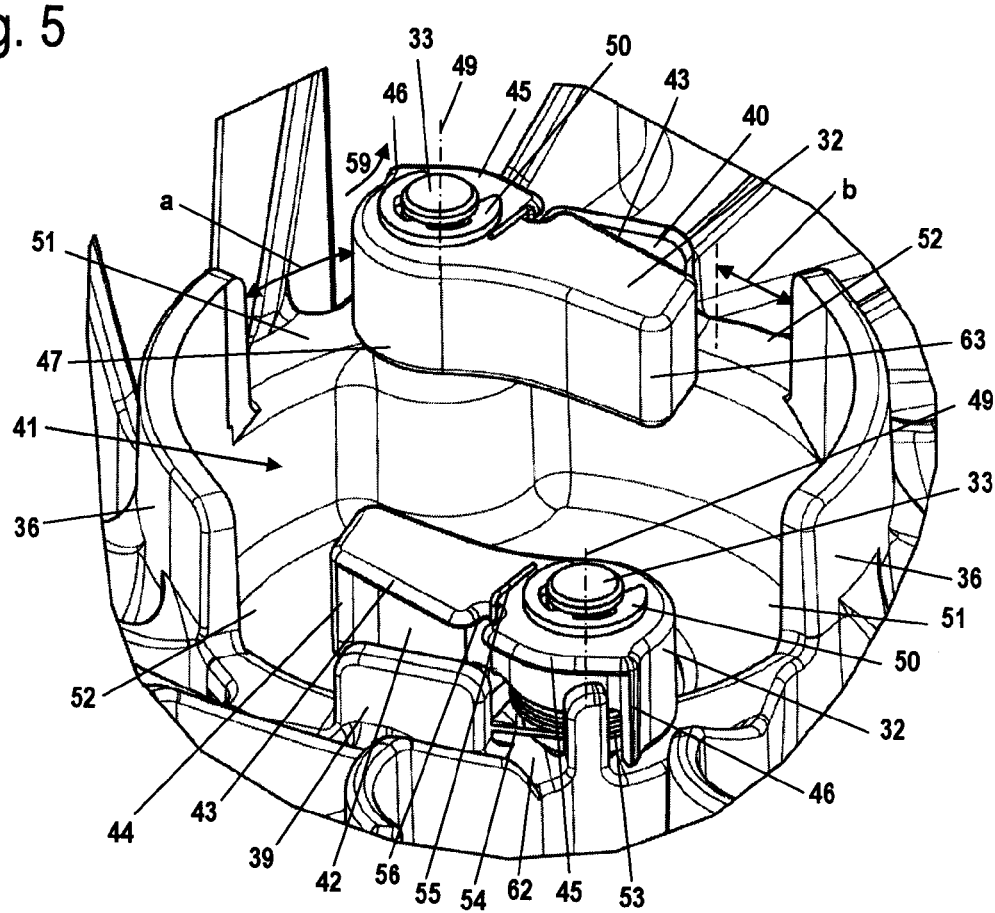
FIG. 5 shows a detail view of the pawls of the fan wheel of FIG. 4.

FIGS. 4 and 5 show the pawls 32 on the flywheel 10. As shown in FIG. 4 and FIG. 5, two pawls 32 that are positioned substantially opposite one another are provided. The pawls 32 are arranged and configured so as to have rotational symmetry relative to the axis of rotation 61 (FIG. 3). The two pawls 32 are arranged in a receiving space 41 that is located in the area of the hub of the flywheel 10 and that is delimited radially outwardly by a peripheral wall 60. As shown in FIG. 4 and FIG. 5, the peripheral wall 60 is not extending continuously about the entire circumference of the receiving space 41. The peripheral wall 60 has two wall sections 36 that are arranged opposite one another; between the circumferential ends of the wall sections a pawl 32 is supported, respectively. As shown in FIG. 5, adjacent to the pivot axis 49 of each pawl 32 a first penetration 51 is provided in the peripheral wall 60. The first penetration 51 has a width a in the circumferential direction relative to the axis of rotation 61 (illustrated in FIG. 3); said width a is measured between the wall section 36 and the pawl 32 and is advantageously approximately 2 mm to approximately 15 mm, in particular approximately 5 mm to approximately 10 mm. The width a varies as the pawl 32 is being pivoted.

On the other end of pawl 32, adjacent to the locking nose 63 provided on the pawl 32, a second penetration 52 is formed. The locking nose 63 interacts in operation with the locking elements 31 of the follower 29. The second penetration 52 has a width b in the circumferential direction relative to the axis of rotation 61; the width b is advantageously also approximately 2 mm to approximately 15 mm, in particular approximately 5 mm to approximately 10 mm. The width b is measured in particular in the completely outwardly pivoted position of the pawl 32. The position of the pawl 32 when completely pivoted outwardly is indicated in FIG. 5 by a dashed line.

As shown in FIG. 4, the peripheral wall 60 in the area of the pawl 32 is comprised of a first rib 37 and a second rib 39. Between the two ribs 37 and 39 a third penetration 62 is formed. The first rib 37 forms a first stop 38 against which the pawl 32 rests when in the completely inwardly pivoted position, i.e., in the coupled position of the locking mechanism 30. The second rib 39 forms of second stop 40 against which the pawl 32 rests when in the completely outwardly pivoted position, i.e., in the decoupled position of the locking mechanism 30. In this connection, the pawl 32 rests with a recess 42 against the second stop 40.

Radially outside of the peripheral wall 60 the flywheel 10 has several vanes 35 for conveying cooling air. The flywheel 10 serves also for generating ignition energy for triggering an ignition spark of the internal combustion engine 8 by means of an ignition module, not illustrated. For this purpose, on the circumference of the flywheel 10 two pole shoes 34 are provided.

As shown in FIG. 5, the pawls 32 are secured on the bearing bolt 33 by a securing ring 50, respectively. In operation, the pawls 32 move relative to the bearing bolts 33. This movement can be impaired by dirt deposited on the pawls. In order to prevent this, the pawls 32 have several covers that protect the elements relative to which the pawls 32 are moveable from dirt. The covers are arranged in such a way that the elements to be protected are leeward, i.e., in relation to the radial direction relative of the axis of rotation 61 (FIG. 3) in which the centrifugal force acts on the dirt particles, the covers are positioned in front of or adjacent to the elements to be protected. The elements to be protected are in particular the two ribs 37, 39 that form the stops 38, 40.

FIG. 5 shows that on the side of the pawls 32 facing the follower 29, i.e., on the side facing upwardly in FIGS. 4 and 5, a first cover 43 is arranged. The first cover 43 covers the second rib 39 and thus the second stop 40 on the side that is facing the follower 29 (FIG. 3). A second cover 44 is arranged in the circumferential direction relative to the axis of rotation 61 on the side of the pawl 32 facing away from the pivot axis 49. The pawl 32 has a third cover 45 that is arranged in the area of the first rib 37 and covers the first rib 37 on the side facing the follower 29. The third cover 45 covers also the third penetration 62. A fourth cover 46 is provided on the pawl 32 and covers the first rib 37 in the circumferential direction. The covers 43, 44, 45, 46 delimit the recess 42 arranged on the outwardly facing side of the pawl 32. In the completely inwardly pivoted position of the pawl 32 the covers 45 and 46 are positioned so as to be adjacent to the rib 37. In the completely outwardly pivoted position of the pawl 32 the covers 43 and 44 are positioned adjacent to the rib 39.

As shown in FIGS. 4 and 5, on each pawl 32 a spring 53 is arranged. The spring 53 has a first leg 54 that is supported on the second rib 39. The second leg 55 of the spring 53 projects through a groove 56 of the pawl 32 and is supported on the pawl 32. The spring 53 loads the pawl 32 radially inwardly.

As shown in FIG. 5, the fourth cover 46 is configured as a flow deflecting or guiding element and points away from the first rib 37. The resulting flow direction is indicated by arrow 59. The configuration of the fourth cover 46 as a flow deflecting element reduces soiling of the pawl 32.

The spring 53 is covered relative to the receiving space 41 by a fifth cover 47 of the pawl 32. In this way, the spring 53 is arranged in a substantially dust-protected space that is protected from dirt particles by the cover 47.

Figure 6:
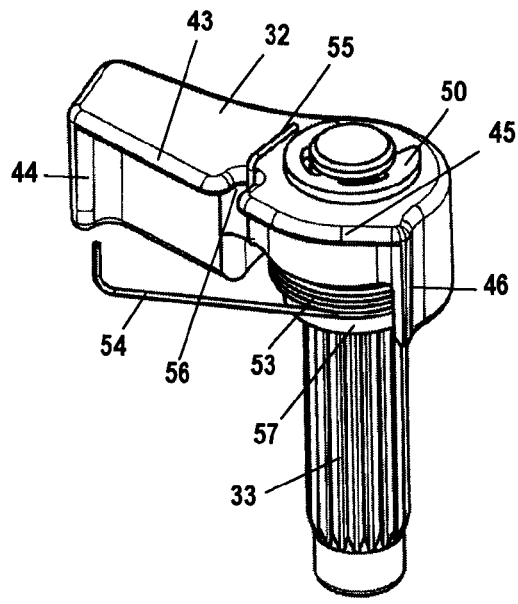
FIG. 6 is a perspective illustration of a pawl arranged on a bearing bolt.
Figure 7:
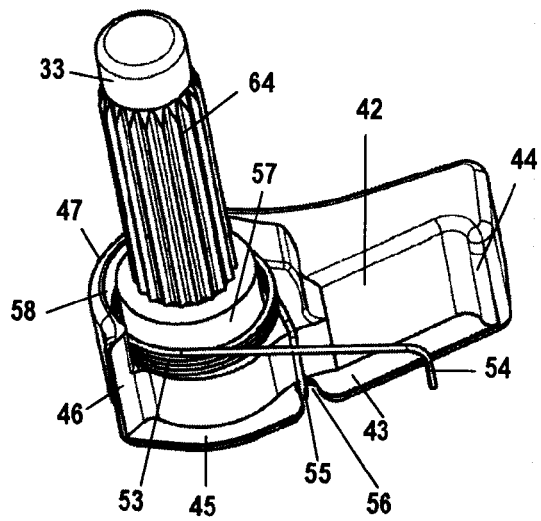
FIG. 7 is another perspective illustration of a pawl on the bearing bolt.

The configuration of the covers 43 to 47 is illustrated also in FIG. 6 and FIG. 7. As is shown also in FIG. 6 and FIG. 7, the bearing bolt 33 has a groove structure 64 at its end to be pressed into the flywheel 10. The groove structure 64 comprises in particular several grooves or a knurled structure is provided. Accordingly, the bearing bolt 33 is secured fixedly in the flywheel 10. The area of the pawl 32 supported on the bearing bolt 33 is free of structuring (grooves, knurls etc.) so that the pawl 32 can rotate unhindered on the bearing bolt 33. As is shown in the Figures, the pawl 32 has a pin 57 which in operation is arranged adjacent to the contact surface of the pawl 32 on the flywheel 10. The spring 53 that is configured as a coil spring with projecting ends (legs) is supported on the pin 57. Between the pin 57 and the fifth cover 47 a groove 58 is formed that extends approximately across half the circumference of the pin 57. The spring 53 is arranged in the groove 58.

Figure 9:
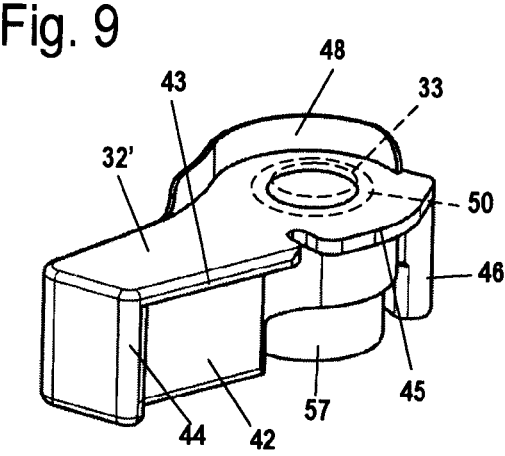
FIG. 9 is a perspective illustration of another embodiments of the pawl.
Figure 10:
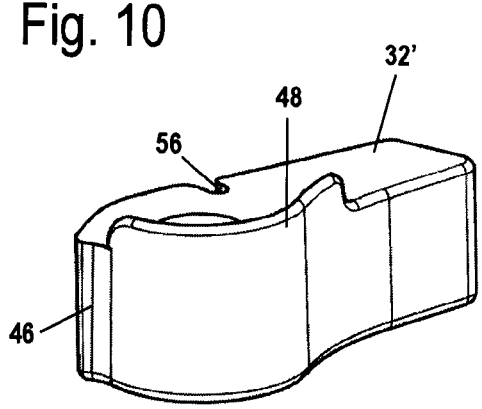
FIG. 10 is another perspective illustration of the embodiment of the pawl of FIG. 9.

FIGS. 9 and 10 show another embodiment of a pawl. The configuration of the pawl 32' correspond substantially to the configuration of the pawl 32. Same reference numerals indicate same components. The pawl 32' has a sixth cover 48 on the end face of the pawl 32' facing the follower 29. The sixth cover 48 neighbors the schematically indicated bearing bolt 33 (see FIG. 9) and the schematically illustrated securing ring 50. The sixth cover 48 extends relative to the axis of rotation 61 in the radial direction between the axis of rotation 61 and the bearing bolt 33 with the securing ring 50. The bearing bolt 33 and the securing ring 50 are positioned relative to the centrifugal force leeward of the sixth cover 48. In this way, soiling of the bearing bolt 33 in the area of the securing ring 50 is prevented.

The covers 43 to 48 have the effect that dirt will not collect on the contact areas where the pawl 32 contacts the bearing bolt 33 and the flywheel 10 because the dirt particles are deflected away from the contact areas. The penetrations 51 and 52 that are in particular arranged on opposite sides of the pawls 32 ensure that dirt that has entered the receiving space 41 can exit again through the penetrations 51, 52 from the receiving space 41. In this way, the servicing intervals of the starter device are significantly extended.

The specification incorporates by reference the entire disclosure of German priority document 10 2007 020 680.3 having a filing date of May 3, 2007.

While specific embodiments of the invention have been shown and described in detail to illustrate the inventive principles, it will be understood that the invention may be embodied otherwise without departing from such principles.

What is claimed is:

1. An internal combustion engine comprising a starter device, wherein the starter device comprises a drive member and a driven member and a locking mechanism for coupling the drive member and the driven member to one another for starting the internal combustion engine, wherein the locking mechanism has at least one pawl that is pivotably supported on the driven member, wherein, for decoupling the drive member and the driven member, the at least one pawl is pivoted outwardly relative to an axis of rotation of the starter device, and wherein the at least one pawl has at least one pivot position in which the at least one pawl contacts at least one contact area of the driven member, wherein the at least one pawl has a first cover covering the at least one contact area, and further comprising a first radially outwardly positioned stop that, relative to the axis of rotation of the starter device, is arranged radially outwardly of the at least one pawl, wherein the first radially outwardly positioned stop determines a first terminal pivot position of the at least one pawl, which first terminal pivot position is a completely outwardly pivoted position of the at least one pawl, and wherein the first cover covers the first radially outwardly positioned stop and is positioned, in the first terminal pivot position, in a direction of action of centrifugal forces adjacent to the first radially outwardly positioned stop and covers a side of first radially outwardly positioned stop which side in the axial direction of the axis of rotation is facing the drive member so that the first radially outwardly positioned stop is located leeward relative to a stream of air generated in operation of the internal combustion engine.

2. The internal combustion engine according to claim 1, wherein the first cover that covers the first radially outwardly positioned stop is arranged on a side of the at least one pawl facing the drive member.

3. The internal combustion engine according to claim 1, wherein the at least one pawl has a second cover that covers the first radially outwardly positioned stop in a circumferential direction relative to the axis of rotation of the starter device.

4. The internal combustion engine according to claim 1, further comprising a second radially outwardly positioned stop that determines a second terminal pivot position of the at least one pawl that is a completely inwardly pivoted position of the at least one pawl.

5. The internal combustion engine according to claim 4, wherein the at least one pawl has a third cover that covers the second radially outwardly positioned stop and is arranged on a side of the at least one pawl facing the drive member.

6. The internal combustion engine according to claim 5, wherein the at least one pawl has a fourth cover that covers the second radially outwardly positioned stop in a circumferential direction relative to the axis of rotation of the starter device.

7. The internal combustion engine according to claim 4, wherein the at least one pawl has a flow deflecting element that deflects the stream of air generated in operation of the internal combustion engine away from the second radially outwardly positioned stop.

8. The internal combustion engine according to claim 1, further comprising a spring loading the at least one pawl toward a completely inwardly pivoted position.

9. The internal combustion engine according to claim 8, wherein the spring is supported on a pin of the at least one pawl and wherein the spring has a first leg supported on the at least one pawl and a second leg supported on the driven member.

10. The internal combustion engine according to claim 1, wherein the at least one pawl is pivotably supported on a bearing bolt and wherein a securing ring is provided that secures the pawl on the bearing bolt.

11. The internal combustion engine according to claim 1, wherein the at least one pawl has a recess and rests with the recess against the first radially outwardly positioned stop.

12. The internal combustion engine according to claim 11, wherein the recess is arranged on a side of the at least one pawl that is facing radially outwardly, wherein the first cover delimits the recess.

13. An internal combustion engine comprising a starter device, wherein the starter device comprises a drive member and a driven member and a locking mechanism for coupling the drive member and the driven member to one another for starting the internal combustion engine, wherein the locking mechanism has at least one pawl that is pivotably supported on the driven member, wherein, for decoupling the drive member and the driven member, the at least one pawl is pivoted outwardly relative to an axis of rotation of the starter device, and wherein the at least one pawl has at least one pivot position in which the at least one pawl contacts at least one contact area of the driven member, wherein the at least one pawl has at least one cover covering the at least one contact area, wherein the at least one pawl is arranged in a receiving space of the driven member, wherein the receiving space is delimited by a peripheral wall and wherein the peripheral wall has at least one penetration.

14. The internal combustion engine according to claim 13, wherein the at least one penetration is arranged adjacent to the at least one pawl.

15. The internal combustion engine according to claim 14, wherein a first one and a second one of the at least one penetration are arranged on opposite ends of the at least one pawl in the circumferential direction relative to the axis of rotation of the starter device, respectively.

16. The internal combustion engine according to claim 13, wherein in the circumferential direction relative to the axis of rotation of the starter device a measured width of the at least one penetration is approximately 2 mm to 15 mm.

17. The internal combustion engine according to claim 16, wherein the measured width is approximately 5 mm to 10 mm.

18. An internal combustion engine comprising a starter device, wherein the starter device comprises a drive member and a driven member and a locking mechanism for coupling the drive member and the driven member to one another for starting the internal combustion engine, wherein the locking mechanism has at least one pawl that is pivotably supported on the driven member, wherein, for decoupling the drive member and the driven member, the at least one pawl is pivoted outwardly relative to an axis of rotation of the starter device, and wherein the at least one pawl has at least one pivot position in which the at least one pawl contacts at least one contact area of the driven member, wherein the at least one pawl has at least one cover covering the at least one contact area, and further comprising a spring loading the at least one pawl toward a completely inwardly pivoted position, wherein the spring is supported on a pin of the at least one pawl and wherein the spring has a first leg supported on the at least one pawl and a second leg supported on the driven member, and wherein the at least one cover covers the pin relative to the axis of rotation of the starter device radially inwardly.

19. An internal combustion engine comprising a starter device, wherein the starter device comprises a drive member and a driven member and a locking mechanism for coupling the drive member and the driven member to one another for starting the internal combustion engine, wherein the locking mechanism has at least one pawl that is pivotably supported on the driven member, wherein, for decoupling the drive member and the driven member, the at least one pawl is pivoted outwardly relative to an axis of rotation of the starter device, and wherein the at least one pawl has at least one pivot position in which the at least one pawl contacts at least one contact area of the driven member, wherein the at least one pawl has at least one cover covering the at least one contact area, wherein the at least one pawl is pivotably supported on a bearing bolt and wherein a securing ring is provided that secures the pawl on the bearing bolt, and wherein the at least one cover covers the securing ring relative to the axis of rotation of the starter device radially inwardly.

\* \* \* \* \*